United States Patent
Hars

(10) Patent No.: US 10,122,690 B2
(45) Date of Patent: Nov. 6, 2018

(54) DATA ENCRYPTION AND AUTHENTICATION USING A MIXING FUNCTION IN A COMMUNICATION SYSTEM

(71) Applicant: The Boeing Company, Chicago, IL (US)

(72) Inventor: Laszlo Hars, Lafayette, CO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/797,813

(22) Filed: Jul. 13, 2015

(65) Prior Publication Data

US 2017/0019376 A1    Jan. 19, 2017

(51) Int. Cl.
*H04L 29/06* (2006.01)

(52) U.S. Cl.
CPC ........ *H04L 63/0428* (2013.01); *H04L 63/068* (2013.01)

(58) Field of Classification Search
CPC ............................ H04L 63/0428; H04L 63/08
USPC .................................................. 713/170–175
See application file for complete search history.

(56) References Cited

U.S. PATENT DOCUMENTS

| | | | | |
|---|---|---|---|---|
| 2009/0097639 | A1* | 4/2009 | Hotta | G09C 1/00 380/29 |
| 2010/0150344 | A1* | 6/2010 | Karroumi | H04L 9/0637 380/45 |
| 2011/0164749 | A1* | 7/2011 | Natarajan | H04W 12/06 380/270 |
| 2014/0044262 | A1* | 2/2014 | Loprieno | H04L 9/0637 380/256 |
| 2015/0052370 | A1 | 2/2015 | Hars et al. | |
| 2015/0058595 | A1* | 2/2015 | Gura | G06F 12/1018 711/206 |
| 2015/0058638 | A1 | 2/2015 | Hars et al. | |
| 2015/0086007 | A1* | 3/2015 | Mathew | H04L 9/0631 380/28 |
| 2015/0110267 | A1* | 4/2015 | Wu | H04L 9/0861 380/44 |
| 2015/0121035 | A1* | 4/2015 | Steele, Jr. | G06F 12/1018 711/216 |
| 2015/0169467 | A1* | 6/2015 | Chase | G06F 12/1018 711/216 |
| 2015/0319151 | A1* | 11/2015 | Chastain | H04W 12/04 713/171 |

(Continued)

OTHER PUBLICATIONS

Paul et al., "A fast and secure encryption algorithm for message communication," 2007 IET-UK International Conference on Information and Communication Technology in Electrical Sciences (ICTES 2007) Year: 2007.*

(Continued)

*Primary Examiner* — Roderick Tolentino
(74) *Attorney, Agent, or Firm* — Walters & Wasylyna LLC

(57) ABSTRACT

A method of encrypting and authenticating messages in a communication system includes generating new keys by receiving a plurality of parameters including at least one of an initial key, a nonce, a sequence number, and a previous key. The method may include applying a mix function to generate a subsequent key based on the plurality of parameters for key rolling. The method may include encrypting and authenticating data using different subsequent keys.

20 Claims, 7 Drawing Sheets

(56) References Cited

U.S. PATENT DOCUMENTS

2016/0062919 A1 3/2016 Hars
2016/0062920 A1 3/2016 Hars
2016/0065368 A1 3/2016 Hars
2016/0321460 A1* 11/2016 Suter .................. G06F 21/6209

OTHER PUBLICATIONS

Cincilla et al., "Light blind: Why encrypt if you can share?," 2015 12th International Joint Conference on e-Business and Telecommunications (ICETE) Year: 2015, vol. 04.*

* cited by examiner

DATA ENCRYPTION AND AUTHENTICATION USING A MIXING FUNCTION IN A COMMUNICATION SYSTEM

FIELD

The present disclosure relates generally to providing privacy and data authentication in communication systems subject physical attacks and, in particular, to using a mixing function in key rolling for data encryption and data authentication in communication systems.

BACKGROUND

Safeguarding communication networks is becoming increasingly critical as the volume and importance of transmitted data needing protection expands, and attacks to communication system are becoming progressively sophisticated. Secure communication systems must incorporate safety measures for transmitting sensitive information. Such communication systems can be found in space and defense programs, commercial aviation, as well as in daily activities including WiFi, cellphones, wireless communication systems, and/or cable networks. Moreover, communications within the aviation industry among on-board systems, between flight crew and on-board systems, flight crew and ground-based control, on-board systems and their respective vendors, even between passengers and external sources/destinations require network infrastructures.

Unfortunately, in many communication systems, adversaries can intercept, capture and/or modify transmitted data. For example, messages can be redirected by copying over (encrypted or unencrypted) headers of other messages and/or by replaying previously captured complete messages. An illicit reset or shut down command sent to a mission critical component can be disastrous. Moreover, adversaries may even access parts of transmitted messages, which can be vulnerable to attacks, such as the identification of the recipient or the sender of the communication transmission. Adversaries can expose information about system activities.

To thwart these threats, the message recipient must detect such attacks on the communication system or transmitted message. In traditional threat models, attacks on communication channels are investigated, while the senders and receivers are assumed to operate in secure environments. In many practical cases, the traditional threat model is not adequate, as an adversary may gain physical access to senders or receivers, in addition to listening to messages, and also sending rogue messages. Therefore, it may be desirable to have a system and method that provides a robust solution for secure communication in communication systems that are improved in security and more efficient in operation.

SUMMARY

A technique has been developed to provide protection of data within a communications network in order to prevent malicious attempts to gain access to communications systems, network structures, or transmitted messages. This technique involves encrypting and authenticating communication transmission for protecting data transmissions from adversarial attacks.

The technique employs encrypting and integrity checking of transmitted data by periodically changing encryption keys and authentication keys in very little computational time, in most applications within a single clock cycle. The computational time of the encryption or authentication keys according to this invention is much shorter as compared to traditional key rolling methods of cryptographic functions, resulting in lower energy consumption and increased efficiency of speed, power, and security of communication systems. An enhanced key rolling technique is disclosed for ciphers and message authentication code generators by using a mixing function that is small (e.g., small in chip area or code size), more efficient, highly parallel and extremely fast in comparison to existing systems.

According to one aspect of example implementations, various systems and methods are provided for encrypting and authenticating data in a computer system using a mixing function for key rolling. The various methods and systems can include encrypting data in the computer system. The methods and systems can include receiving multiple parameters including at least one of an initial key, a nonce, a sequence number, and a previous key. The various methods and systems can include applying the mixing function to generate a subsequent key (e.g., a next key) based on the multiple parameters for key rolling of a computing system. The various methods and systems can include encrypting data, decrypting data, and/or authenticating data using the subsequent key.

In one aspect, various systems and methods are provided for protecting data and providing security in a computer system. Example implementations provide an algorithm that may be applied by changing the encryption and the authentication keys after a predetermined number of transmitted blocks, which can be encrypted and authenticated. After a predetermined number of encrypted and authenticated data blocks are transmitted, both encryption keys and authentication keys can be changed. New keys can be generated using a mixing function typically in a single clock cycle (or at most two clock cycles) for key rolling. The new keys are substantially uncorrelated to any previously used keys. The keys must be kept secret and changed periodically. The new keys are generated with substantially no side channel leakage, and the use of such key rolling reduces and substantially minimizes the usability of side channel leakage from cryptographic operations, preventing an adversary from gaining useful information from observing side channels of information leakage from network components.

BRIEF DESCRIPTION OF THE DRAWINGS

Figure 1:
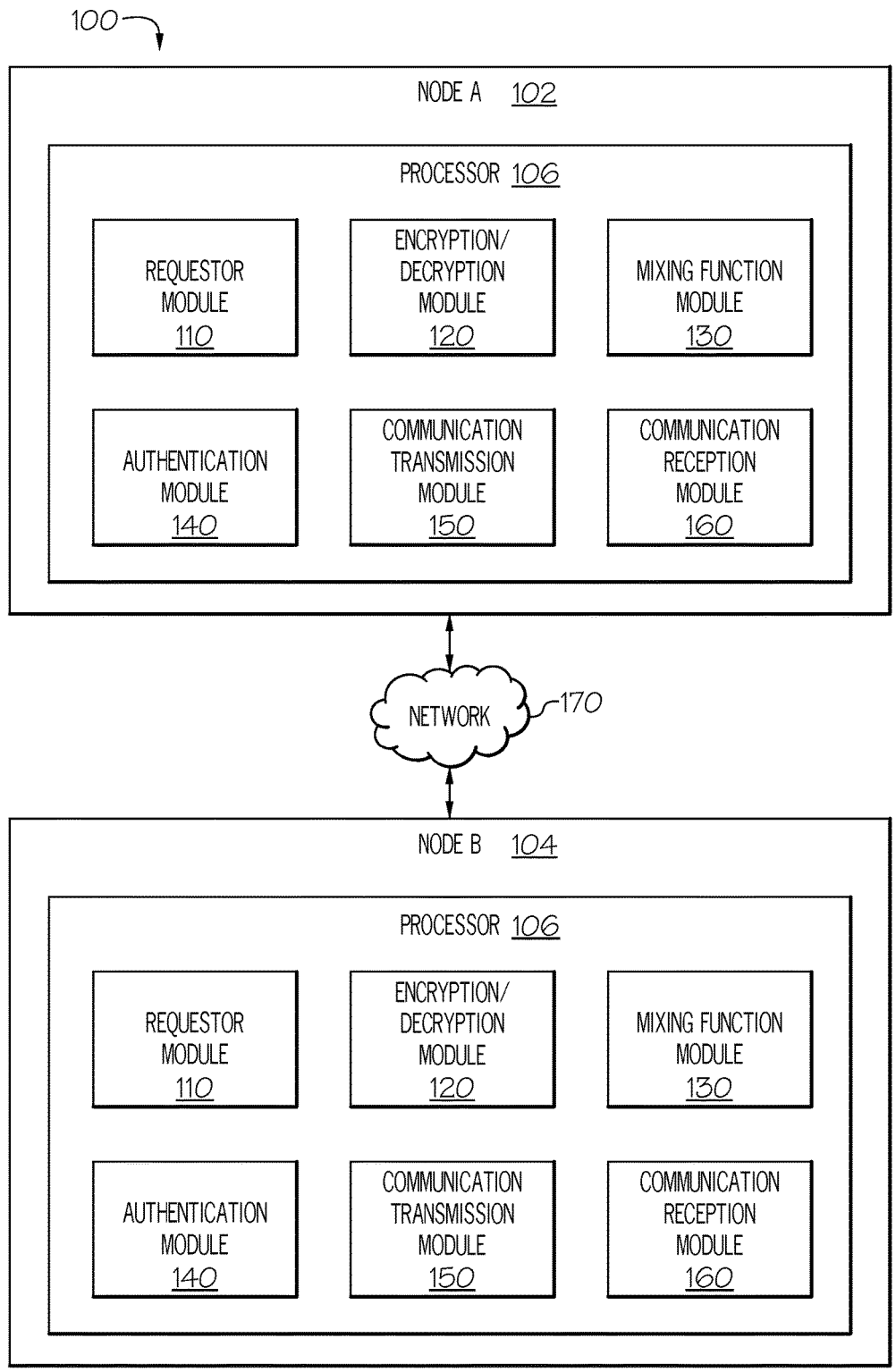
Figure 2:
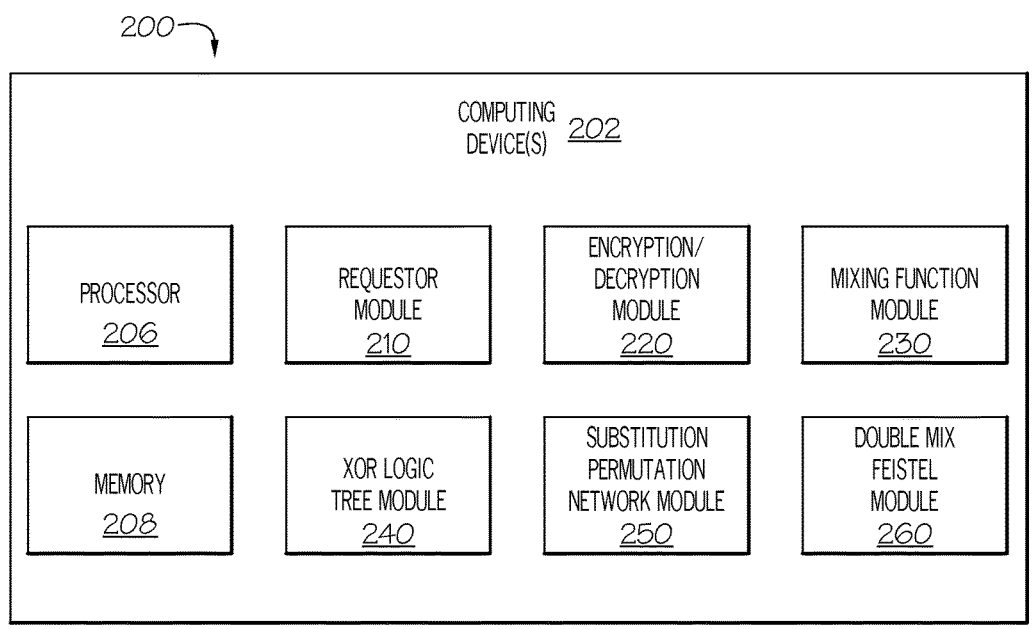
Figure 3:
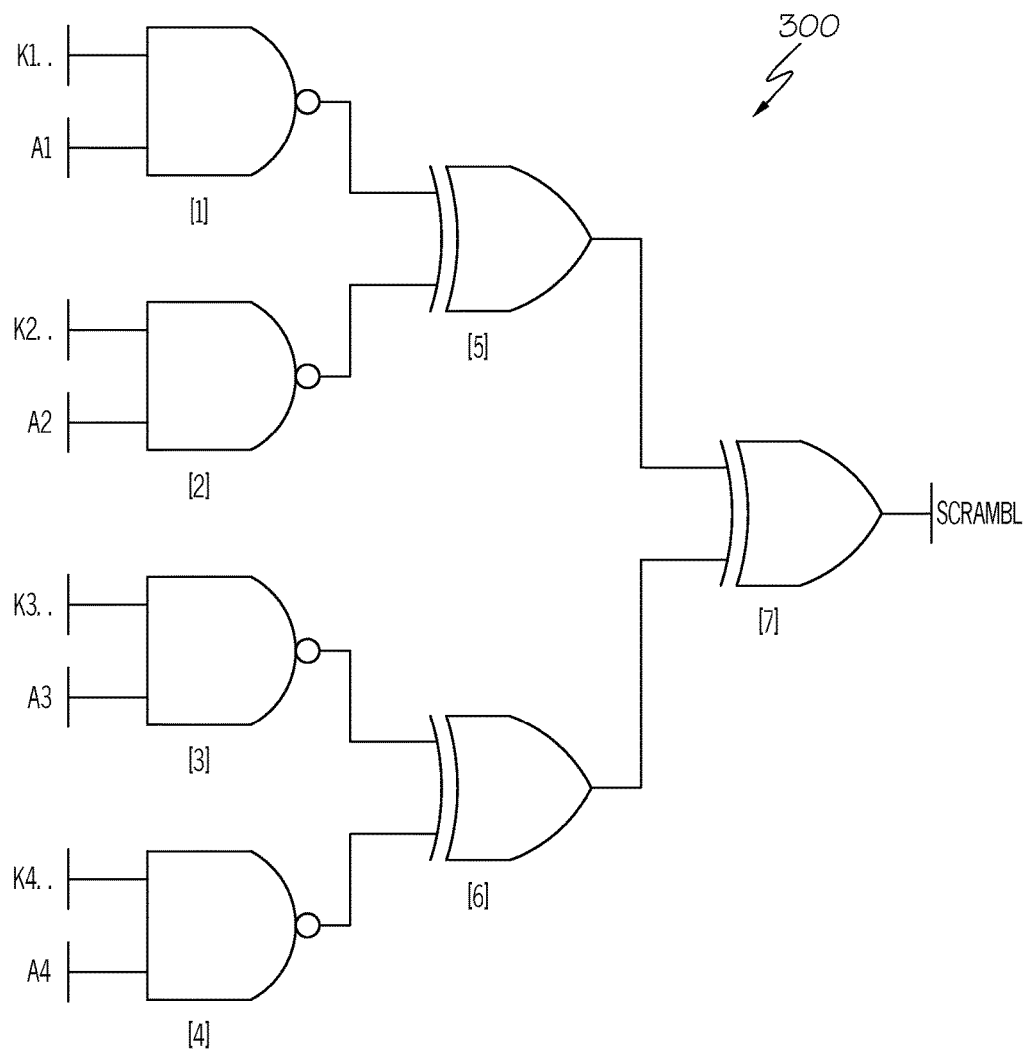
Figure 4:
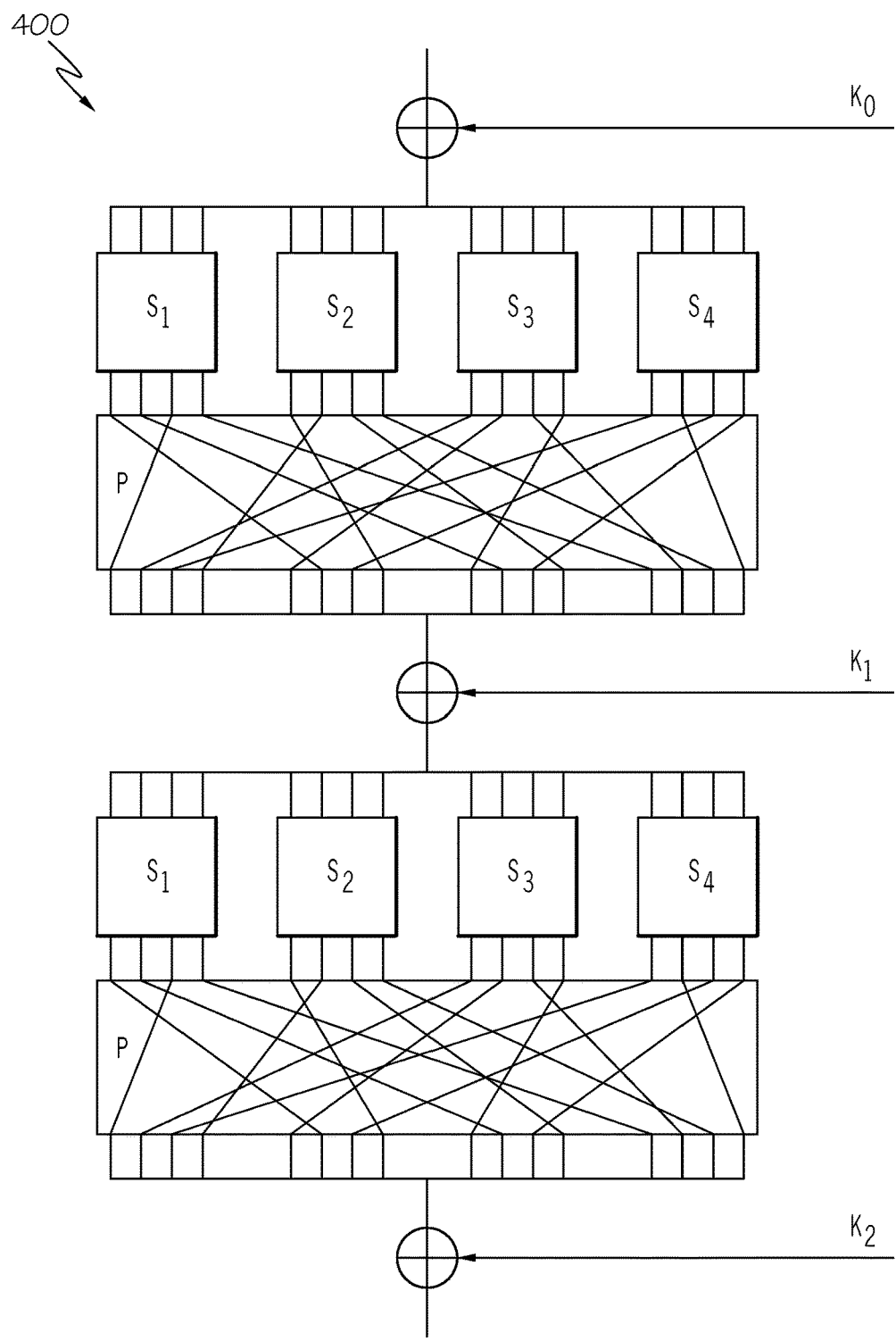
Figure 5:
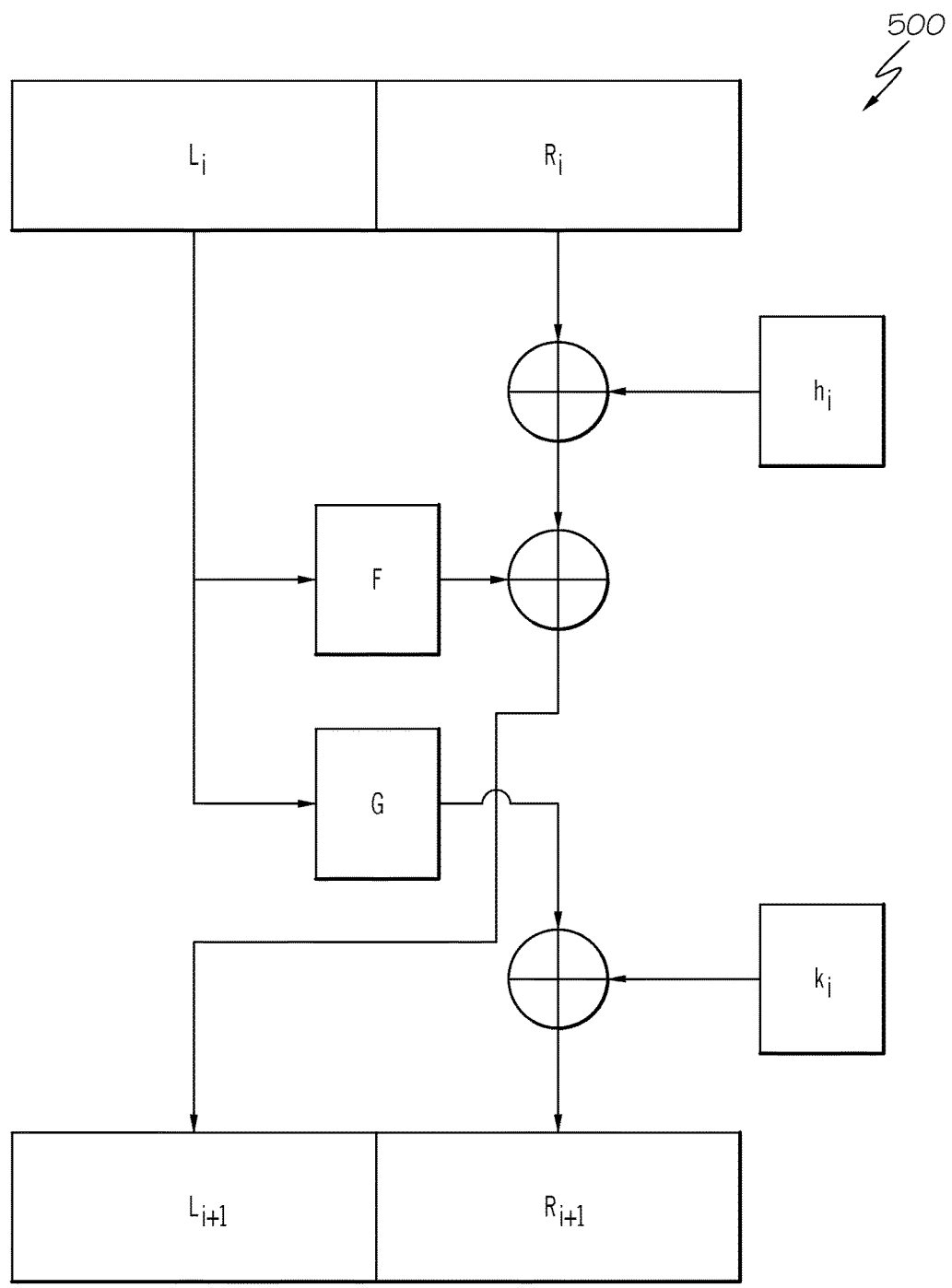
Figure 6:
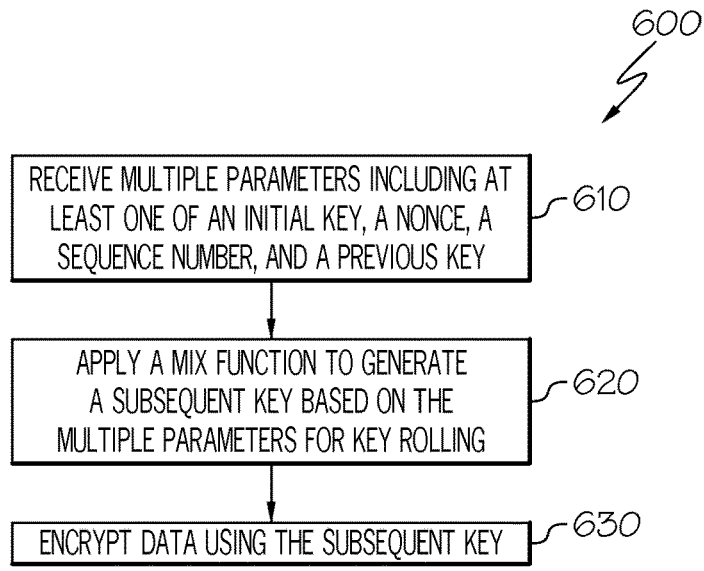
Figure 7:
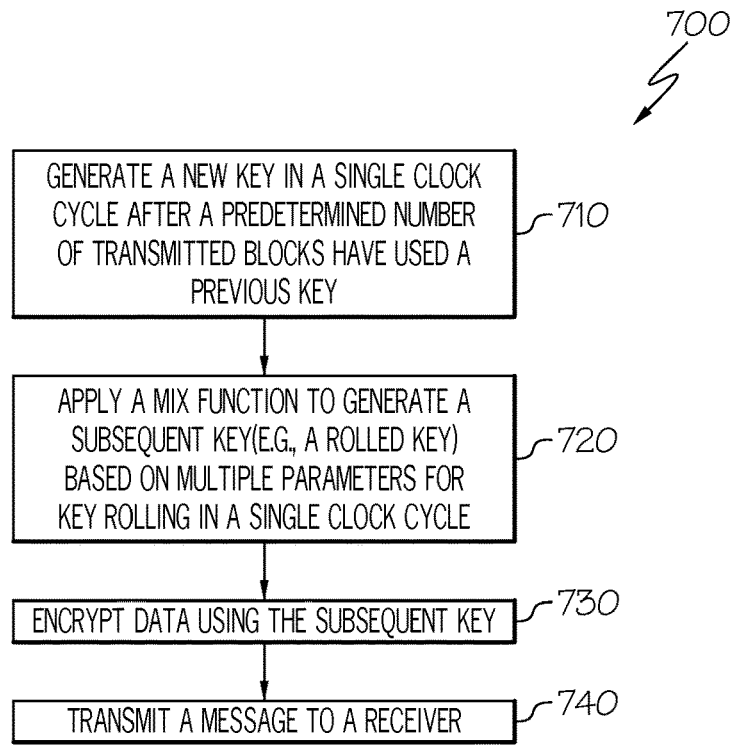
Figure 8:
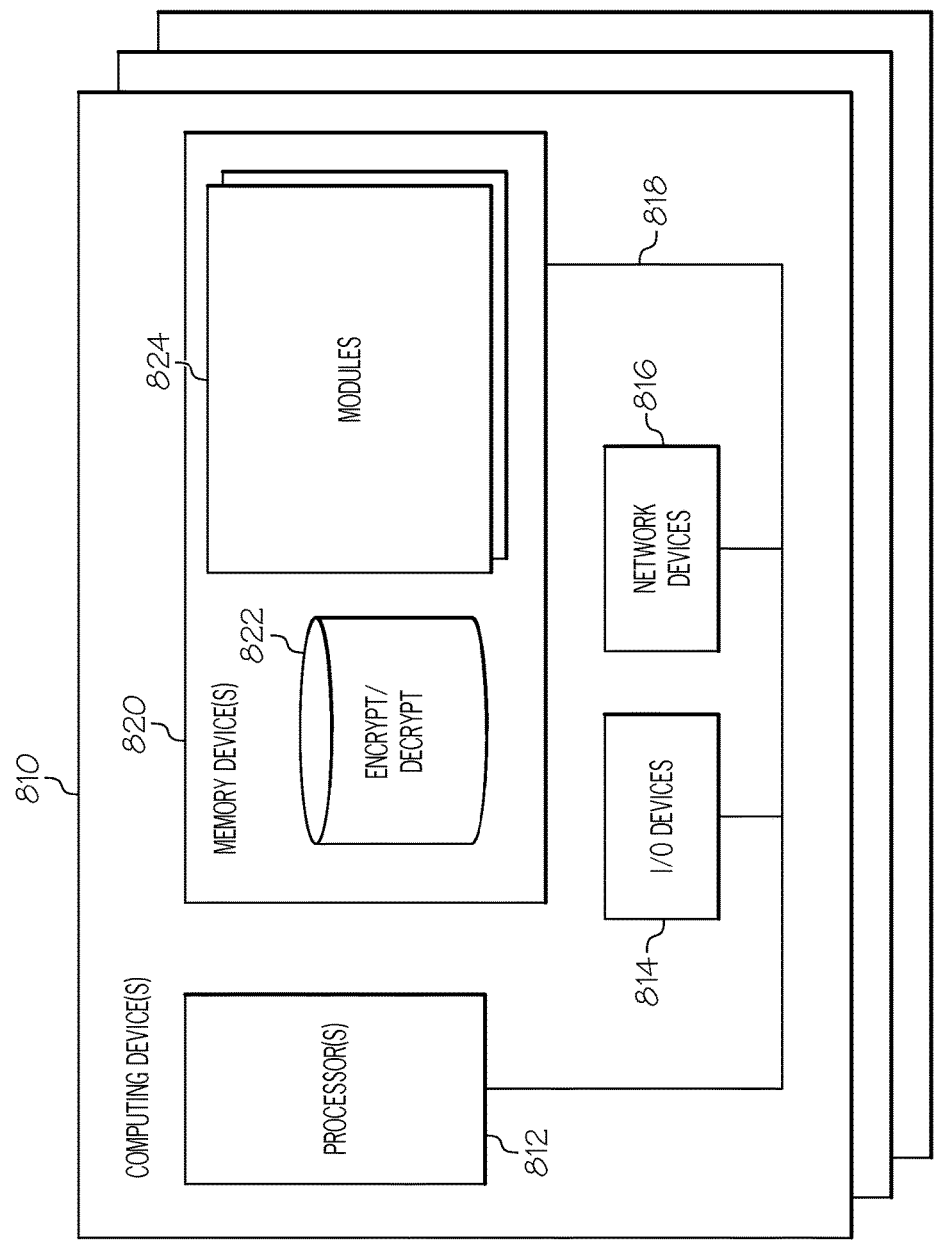

Having thus described example implementations of the disclosure in general terms, reference will now be made to the accompanying drawings, which are not necessarily drawn to scale, and wherein:

FIG. 1 is an illustration of a system in accordance with example implementations of the present disclosure;

FIG. 2 is an illustration of a system that in some examples may correspond to the system of FIG. 1;

FIG. 3 illustrates a binary tree of exclusive-or (XOR) key generator, in accordance with various example implementations;

FIG. 4 illustrates a substitution-permutation network key generator, in accordance with various example implementations;

FIG. 5 illustrates a double-mix Feistel network (DMFN) key generator, in accordance with various example implementations;

FIG. 6 illustrates a flowchart including various operations in a method according to example implementations;

FIG. 7 illustrates a flowchart including various operations in a method according to example implementations; and FIG. 8 is a block diagram that provides an example illustration of a computing device that may be employed in the present technology.

DETAILED DESCRIPTION

Some implementations of the present disclosure will now be described more fully with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference to something as being a first, second or the like should not be construed to imply a particular order. Also, for example, reference may be made herein to quantitative measures, values, relationships or the like (e.g., planar, coplanar, perpendicular). Unless otherwise stated, any one or more if not all of these may be absolute or approximate to account for acceptable variations that may occur, such as those due to engineering tolerances or the like. Furthermore, it should be understood that unless otherwise specified, the terms "data," "content," "information," and similar terms may be at times used interchangeably. Like reference numerals refer to like elements throughout.

Safeguarding communication networks is a constant concern for protecting the integrity of data and the communications network. Sensitive infrastructure information, like encryption keys or authentication keys can remain hidden in protected storage of a communications device, but when encryption keys and authentication keys are used, some related information can leak via side channels. (Information about system activities can inadvertently appear, "leak" in reaction time of the system to a stimulus, voltage fluctuation on component connectors, variations of power consumption, electromagnetic or ultrasonic radiation, etc. The conveyers of the leaked information are called in the art Side Channels.) The leaked information can reveal secret data or cryptographic keys, and compromise the security of the whole communication system. Side channel leakage can cause security problems even under encrypted communication, if identical or closely related cryptographic keys are used repeatedly.

Thus, as described herein, various systems and methods are provided for providing security in a communication system to protect the integrity and security of the transmitted data. In one aspect, transmitted data in the communication system can be encrypted and authenticated. Encryption keys and authentication keys of data blocks can be periodically changed using a mixing function in typically (but not necessarily) a single clock cycle with increased efficiency and speed while lowering energy consumption compared to the case, when cryptographic functions are used for key changes. That is, ciphers and message authentication code generators can use a mixing function that is small (e.g., small in chip area or code size), more efficient, highly parallel and extremely fast in comparison to existing systems. Communication protocols can be devised providing extremely fast (e.g., needing only a single clock cycle in most electronic hardware) and low energy methods for periodically changing encryption and authentication keys ("key rolling"), which protect transmitted data.

More specifically, after a predetermined number of encrypted and authenticated data blocks have been transmitted, the mixing function is applied to change the encryption keys and the authentication keys. Subsequent keys are generated by the mixing function. The new and subsequent keys are substantially unrelated and/or uncorrelated to previously used keys. That is, the new keys are keys that have not been previously used, and an adversary cannot determine or identify any correlation between the old keys and the new keys, with reasonable resources of computation. This ensures that the leaked information on side channels does not allow an adversary to the communication system(s) to gain significant advantages in breaking the security of the communication system. The computation of generating the new keys using the mixing function within typically a single clock cycle (or at most two clock cycles) is faster and more efficient as compared to key rolling that is slow and less efficient using a hash function, and reduces information leaks (e.g., side channel leaks) about proprietary or secret data. In other words, the mixing function applied for generating new keys reduces the side channel leakage and the computation time as compared to more leakage and longer processing time of traditional cipher or hash-function based key rolling methods. The resulting protocols and algorithms improve the power usage, efficiency and speed of communication systems in addition to increasing the security of the computing system. Also, specific details regarding key-update frequency and secret keys remain proprietary for each deployment. This adds further complexity for preventing an attack on the computing in addition to the challenge of extracting secret keys from the electronics under attack.

Referring now to FIG. 1, a system 100, such as a communication system, is illustrated according to example implementations of the present disclosure. The system 100 may include one or more of each of a number of components, units or the like (generally "components") at least some of which may be composed of logic circuits such as multiplexers, registers, arithmetic logic units, memory, microprocessors and the like. The system 100 may be designed for any of a number of different applications, and may have particular applicability in systems including or coupled to memory susceptible to attacks, such as in-flight computers, military and space programs, corporate network, personal and laptop computers, and/or smart mobile devices. As shown, for example, the system 100 may include one or more components referred to herein as nodes, such as node A 102 and node B 104 in a communication system. Node A 102 and Node 104 may each include at least one processor 106. The at least one processor 106 may be in communication with a requestor module 110, an encryption/decryption module 120, a mixing function module 130, an authentication module 140, a communication transmission module 150, and/or a communication reception module 160.

In system 100, node A can communicate directly with node B via the network 170. It should be noted that node A 102 and node B 104 are illustrated as being wirelessly connected for illustrative purposes only. In this scenario, node A 102 and node B 104 are communicatively coupled to a network/sub-network such that communications between node A 102 and node B 104 are essentially sent wirelessly between each other via network 170. The system 100 may include, for example, a local-area network (LAN) and/or a wide-area network (WAN), and may include wired and/or wireless links, wireless communications network, or the like. The network 170 may be, but not limited to, a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof.

In one aspect, the requestor module 110 can be configured to initiate or otherwise request read and/or write transactions (at times referred to as operations) with both the communication transmission module 150 and communication reception module 160. The system 100 may further include one or more components referred to herein as encryption/decryption module 120 configured to encrypt and decrypt data transfers between a requestor module 110 and the communication transmission module 150 and the communication reception module 160 on each respective node, and may be used in at least some, if not all, read or write transactions involving the processor 106. In one aspect, an authentication module 140 may also be configured to authenticate the contents of data packets, such as authenticating both encryption keys and/or authentication keys. Additionally, the mixing function module 130 on both node A 102 and node B 104 can be configured to change both encryption keys and authentication keys following a transmission of data.

For example, the requestor module 110 can initiate a read or write transaction from node A 102 to node B 104. The encryption/decryption module 120 on node A 102 may encrypt all or a portion of the transmission message for a read or write transaction. A predetermined amount and/or size of the transmission message can be transmitted via the communication transmission module 150 via network 170 to node B 104. The authentication module 140 may authenticate the encryption keys and/or authentication key.

In one aspect, after a predetermined number of encrypted and authenticated transmitted blocks of the transmission message have been transmitted from node A 102 to node B 104, both the encryption and the authentication keys can be changed using the mixing function module 130. The new keys generated by the mixing function module 130 are significantly uncorrelated to the previously used keys used to send the previous predetermined number of encrypted and authenticated transmitted blocks, which node B 104 has already received. The mixing function module 130 can generate the new, subsequent keys using the mixing function of the processor 106. The mixing function module 130 can be reapplied to generate new, subsequent keys after each predetermined number of predetermined sized blocks of the transmission message. Moreover, the authentication module 140 may authenticate the transmission message using the subsequent key.

FIG. 2 illustrates one example of a system 200 that in some examples may correspond to the system 100 of FIG. 1. The system 200 may include one or more of each of a number of components, units or the like (generally "components") at least some of which may be composed of logic circuits such as multiplexers, registers, arithmetic logic units, memory, microprocessors and the like. The system 200 may be designed for any of a number of different applications, and may have particular applicability in systems including or coupled to memory susceptible to attacks, such as in-flight computers, military and space programs, corporate network, personal and laptop computers, and/or smart mobile devices. As shown, for example, the system 100 may be, or may include, one or more computing devices 202, such as used in-flight computers, military and space programs, corporate network, personal and laptop computers, smart mobile devices. The computing devices 202 may be standalone devices or components of communication devices, such as intelligent sensors, radio transmitters, networked storage devices and the like.

The one or more computing devices 202 can include a processor 206, a memory 208, a requestor module 210, an encryption/decryption module 220, a mixing function module 230, an XOR logic tree module 240, a substitution-permutation network module 250, and a double mix Feistel network module 260. The XOR logic tree module 240, the substitution-permutation network module 250, and the double mix Feistel network module 260 are each configured to be a key generator.

The processor 206, the memory 208, the requestor module 210, the encryption/decryption module 220, the mixing function module 230, the XOR logic tree module 240, the substitution-permutation network module 250, and a double mix Feistel network module 260 may each be in communication with and operate together with the mixing function module 230.

In one aspect, the requestor module 210 can be configured to initiate or otherwise request read and/or write transactions (at times referred to as operations) with one or more memories 208. The encryption/decryption module 220 can be configured to encrypt and decrypt data transfers between the requestor module 210 and the memory 208, and may be used in at least some if not all read or write transactions with the memory 208. The mixing function module 230 can be similarly configured to operate as the mixing function module 130 described in FIG. 1.

After a predetermined number of encrypted and authenticated blocks of data have been transmitted, both the encryption and the authentication keys can be changed using the mixing function module 230. The new keys generated by the mixing function module 230 are uncorrelated to the previously used keys used to send the predetermined number of encrypted and authenticated transmitted blocks. The mixing function module 230 can generate the new, subsequent keys using the mixing function 230, typically in a single clock cycle of the processor 206, or in at most two clock cycles of the processor 206. In one aspect, the mixing function module 230 can generates the new, subsequent keys using the mixing function 230 by mixing together the various keys generated via the XOR logic tree module 240, the substitution-permutation network module 250, and the double mix Feistel network module 260. In one aspect, the mixing function employed by a specific implementation can use the XOR logic tree, the substitution-permutation network, and the double mix Feistel network key generators or combination thereof. In other words, the mixing function employed by a specific implementation of a key-rolling communication protocol can be any one of the listed three mixing functions (e.g., 1) the XOR logic tree, 2) the substitution-permutation network, and 3) the double mix Feistel network key generators), or the key-rolling communication protocol can use more than one of these mixing functions at the same time, or different mixing functions at different times. Furthermore, other mixing functions familiar by one of ordinary skill in the art, which may be suitable in certain situations, may also be employed, such as, for example, RAX (Rotate-Add-Xor) constructions on microprocessors. The mixing function module 230 can be reapplied to generate new, subsequent keys after each predetermined number of predetermined sized blocks of the transmission message. Moreover, the authentication module 240 may authenticate the transmission message using the subsequent key.

It should be noted that ciphers only with 128-bit block-size are approved by the Federal Information Processing Standards (FIPS), even though key sizes can be set to 256 bits or longer for higher security applications. Ensuring that every input bit of the key generator affects every output bit requires at least 3 such 128-bit cipher operations, which can be slow and inefficient. Using a secure hash algorithm (e.g. SHA-256) for key generation is slower and even more inefficient than a cipher based solutions. These ciphers and hash functions, which are currently approved by FIPS, are iterative and, therefore, slow. They are also subject to side channel attacks with readily available tools.

As such, the new, subsequent keys use the mixing function module 230 for key rolling constructions, which does all of the mixing operations for generating the new keys typically in a single clock cycle. At this increased and faster speed for generating the new keys, any side channel analysis is significantly more difficult, and the high speed and parallel construction of our proposed mixing functions substantially reduces side channel leakage.

To satisfy the speed and correlation requirements typically within a single clock cycle of the computing device 202, the mixing functions perform the key rolling. The mixing functions use the following notation MIX(parameters). There are several possibilities for the key rolling using the mixing function module 230. The following equations may be used as part of the mixing function. That is, the mixing function may be of the form of:

$$K[i]=\text{MIX}(K[0],i) \quad (1)$$

$$K[i]=\text{MIX}(K[i-1]) \quad (2)$$

$$K[i]=\text{MIX}(K[i-1],i) \quad (3)$$

$$K[i]=\text{MIX}(K[0],\text{nonce}) \quad (4)$$

$$K[i]=\text{MIX}(K[i-1],\text{nonce}) \quad (5),$$

where, MIX( ) is a mixing function, K[i] is the key generated at the i-th key-rolling step, K[0] is a shared secret initial key between the sender and the recipient of the message, "i" is equal to a sequence number of the message block, "nonce" is a umber used once (shorthand of Number used ONCE). The nonce can be transmitted together with a message, such that the recipient of the message is also able to compute the same keys, which were used by the sender. A random nonce has to be at least 64 bit long to have low probability of collision (repetition). A sequentially incremented nonce can be shorter (e.g. 32 bit), which allows 4 billion different nonces, but in this case the key generator must have persistent memory. Also, the initial keys can be different for each sender-recipient pair, but the same initial keys can also be used for multiple pairs. It should also be noted that while equations (1)-(5) are provided as example key rolling equations, other key rolling equation combinations may be employed, such as, for example, using K[i−2], using both i and nonce, and or other combinations, without departing from the scope of the present disclosure. Each mixing operation used in the mixing function module 230 can also process additional pieces of information. For example, the additional pieces of information can include at least an identification (ID) of the sender or the recipient, which are known by each communicating party, a current date, and/or current time of the day.

In one aspect, if a message is long, the long message may contain many message blocks. Keys for each message block can be rolled using the mixing function module 230 sequentially with any of the algorithms of equations 1, 2, or 3 as described above. Both the sender and the recipient can also know the "i-th" sequence number. As such, the "i-th" sequence number does not need to be transmitted. In one aspect, each message header can contain a nonce (a.k.a. initial vector "IV"). This nonce adds to a length of the message, but it is insignificant for long messages. The first key for the long message can be generated by algorithms using equations (4) or (5). In the event that a need exists for recovering from an error condition of lost or duplicated messages, equations (4) and/or (5) can be used to reset the sequence number to 0.

As mentioned, the messages may contain message headers containing the ID of the recipient in order to locate the entity receiving the transmitted message. The message header can also contain the ID of the sender for providing the information for the recipient. If both the sender ID and the recipient ID are left unencrypted, an eavesdropper can map the communication patterns in the network and sensitive information may be inadvertently revealed. As such, the message headers can also be encrypted. All potential recipients can decrypt and authenticate all the message headers available in to the recipients the network.

For example, if the message was authenticated with a key unknown to the recipient, the recipient can indicate that the message was either damaged or was sent to another entity, so the message with the unknown key can be ignored.

If a recipient can properly authenticate the message header, the authentication process means the correct shared key and sequence number was used to decrypt the message. From the decrypted message header, the recipient can determine if the massage was sent to the recipient or sent to another entity with the same-shared keys.

Also, it should be noted that the mixing functions described herein are similar to ciphers, but much faster even though less secure than ciphers in cryptographic sense. Mixing functions can be unfit for encryption operations by themselves, but when both the input and output are hidden from an adversary, the adversary of the system can be prevented from launching a cryptologic attacks or side-channel attack. Hence, the fast mixing functions (the mixing function is denoted by "MIX( )" above) are ideal for cryptographic key generation, particularly because secret keys produce other secret keys, that is, both the input and the output of the mixing function is hidden from an adversary.

When the mixing function module 230 employs a mixing function, the mixing function may have the following properties: 1) the mixing function can map n-bit inputs to n-bit outputs (n=block size), 2) the operation of the mixing function can depend on a large amount of secret key material, which can be generated from a single key or produced by a random number generator; possibly a combination of these, 3) the mixing function can be bijective (invertible), 4) every input bit influences every output bit in non-linear way), and 5) almost all nonempty sets of input bits, independently generated from the key material, can also influence every output bit (no effect cancels).

Suitable mixing functions used by the mixing function can be XOR logic trees, substitution-permutation networks, and double-mix Feistel networks (DMFN). The XOR logic trees module 240 can provide the XOR logic tree, the substitution-permutation network (SPN) module 250 can provide the SPN, and the double-mix Feistel networks (DMFN) module 260 can provide the DMFN. The required nonlinearity can be provided by S-Boxes, which can degenerate to (N) AND/OR gates (2×1 bit S-Boxes).

Turning now to FIGS. 3-5, three MIX functions are illustrated for use in electronic hardware implementations.

FIG. 3 illustrates an XOR tree 300 including a plurality of XOR logic gates that may be implemented to carry out the mixing operation. In FIG. 3, each of the logic gates represents a series of gates, one for each bit of the values on which they operate. The intermediate result may then be scrambled, and if appropriate expanded to a desired length, to produce an encryption key. Input bits Ai (e.g., A1-A4) can select SubKeys (Kb) (e.g., K1, K2 ... K256 in case there are 256 input bits) up to a final XOR operation. A final scramble step ("SCRAMBL") makes the construction nonlinear. The final scramble step can be one or more rotate-add operations, or a series of S-Box functions.

In operation, this may be performed in accordance with a scrambling function (SCR) that operates on the intermediate result of the XOR tree, "$K_{INT}$" to provide the final output, the (rolled) key "Key":

$$Key = SCR_{Kb}(K_{INT})$$

In some examples, this "$K_{INT}$" may be of different length than the length of the resulting key or the input (e.g., 128 ... 256 bits). In this case, the scrambling function also expands or shrinks the result to the correct size.

In some examples, the sequence of subkeys may be divided into first and second sequences, which may produce two sets of subkeys $\{K_{Ai}\}$ and $\{K_{Bi}\}$. When bit i of the input has a binary value of zero, the subkey $K_{Ai}$ may be selected for the XOR tree, and when bit i of the address has a binary value of one, the subkey $K_{Bi}$ may be selected. This may double the amount of key material influencing the generated keys, without increasing the processing time, and may therefore provide added anti-tamper benefits. Moreover, the exact same number of XOR operations may be performed for each input, which may reduce the potential information leakage on side-channels (most notably on variations of power consumptions and delay timing).

FIG. 4 illustrates a substitution-permutation network 300 in accordance with example implementations of the present disclosure. As shown input bits are fed in from the top of FIG. 4, and the output is taken from the bottom of FIG. 4. The ⊕ represents a mixing operation, which in some examples may be an arithmetic (truncated) addition or bitwise logical exclusive-or (XOR) operation. The SubKeys $K_i$ are independent randomly created secrets. The substitution-permutation network 300 includes small nonlinear substitution functions (called S-Boxes) as indicated generally as S-boxes ($S_i$), and/or more specifically as $S_1, S_2, S_3, \ldots$. The number of layers of the mixing network is chosen to be at least twice of the full mixing depth, which is defined as the depth when every input bit effects every output bits.

For example, an input block of data may be mixed (e.g., XOR-ed) with a SubKeys $K_0$, and the result may be mixed through a substation layer including a plurality of S-boxes ($S_i$), and a linear transformation layer including a permutation (P), to produce an updated block of data. The input block of data may be first mixed through the substitution and linear transformation layers to produce the updated block of data, which may then be mixed with the SubKeys $K_i$. In the second layer, the new input block of data may be first mixed through the substitution and linear transformation layers to produce the updated block of data, which may then be mixed with the SubKeys $K_2$. Either or all of the S-boxes and permutation may depend on or be independent each layer (a.k.a. round). And in some examples, at least two of the S-boxes for at least one of the rounds may be different. In the example of FIG. 5, the S-boxes are shown as varying but independent of the round (e.g., $S_i$), and the permutation is also shown as being independent of the round.

As also explained above, the substitution-permutation network in some examples may use simpler and faster s-boxes, which may have less thorough mixing properties. This may enable more rounds of the substitution-permutation network to be performed in an allotted amount of time (e.g., one clock cycle). The net mixing effects may therefore be more thorough, and more bits of key material may be used.

FIG. 5 illustrates a double-mix Feistel network (DMFN) network 500 in accordance with example implementations of the present disclosure. As shown, a first function (F) is a nonlinear and non-invertible function. A second function (G) is invertible. [$L_0, R_0$] is the input of the mixing function, output is taken from the bottom of FIG. 5. The number of layers of the mixing network is chosen to be as high as fits to the single clock-cycle requirement. A block of data for key generation, or plaintext for encryption, may be divided into the initial left half ($L_0$) and initial right half ($R_0$). The updated left half ($L_{i+1}$) and updated right half ($R_{i+1}$) may be calculated for each round i=0, 1, ..., n:

$$L_{i+1} = F(L_i) \oplus R_i$$

$$R_{i+1} = G(L_i) \oplus k_i$$

In the preceding, F and G represent first and second functions, and keys $h_i$ and $k_i$ represents the (two parts of the) round key. The DMFN network 500 can be implemented with keys $h_i$ and $k_i$ to double the mixing performance of the DMFN networks compared to the traditional Feistel network, as it was originally implemented in a data encryption standard (DES) cipher. Also, ⊕ represents a mixing operation, which in some examples may be an arithmetic (truncated) addition or bitwise logical exclusive-or (XOR) operation. The output at round i, then, may be our rolled key ($L_{i+1}, R_{i+1}$).

The first function (F) may be a nonlinear function. The first function may or may not be invertible, although the inverse should (but need not) be hard to compute (one-way function) in instances in which the first function is invertible. The security of the scheme may rely on the secrecy of the round key keys $h_i$ and $k_i$, and on the requirements on F, that it is nonlinear and either has no inverse or has one that is hard to compute. The first function may in some examples depend on the round (e.g., $F_i$), although in other examples, the first function may be independent of the round.

The second function (G) should be invertible, but the inverse need not be easily computable. In instances in which the mixing function (obfuscator) is used as a cipher, deciphering may need the inverse of G (denoted as $G^{-1}$). Similar to the first function, the second function may in some examples depend on the round (e.g., Gi), although in other examples, the second function may be independent of the round.

The DMFN network 500 construction is invertible, because the left half ($L_i$) may be calculated from the updated right half ($R_{i+1}$), and knowing the round key $h_i$ and $k_i$ and $G^{-1}$. The first function (F) can be applied to the left half ($L_i$), and its result mixed with the updated left half ($L_{i+1}$) to yield the right half ($R_i$). This way, the original block of data or plaintext ($L_i, R_i$) may be reproduced from the final output ($L_{i+1}, R_{i+1}$).

Various aspects of the first function (F) and second function (G) according to example implementations of the present disclosure will now be described, beginning with the second function.

In some examples, a layer of substitution boxes (s-boxes) may be used for the second function (G), which may make its mapping nonlinear. In other examples, the second function may perform a circular shift or rotation of the left half, which may then be mixed with the round key to calculate the updated right half. In a more particular example, the second function may produce a circular-shifted version of the left half, each three bits of which may be XOR-ed with a bit of the round key to produce a bit of the resulting, updated right half. In this regard, it may be shown that at block lengths=$2^n$, XORing any three circular shifted versions of the data defines an invertible function. Moreover, in hardware implementations, these shifts or rotations may not consume time as they may be simply implemented with appropriate wirings. Thus, the second function and mixing operations may only require the time of two XOR gate delays, which with optimized cell libraries, may be the time equivalent of 1.5 to 3 NAND2 gate delays.

In instances in which the DFMN is used as a cipher for encryption, the inverse of the second function ($G^{-1}$) may be required for a decipher operation, although certain encryption modes such as counter mode and various feedback modes do not need the inverse of DMFN for a decipher operation, with decryption also being accomplished with the forward direction of the cipher. Further to the above example in which the second function may include rotate-XOR operations, it may be shown that its inverse can also be computed with rotate-XOR operations, although many terms may be needed.

When fast deciphering is desired, the shift or rotation distances may be particularly selected such that only a manageable number of rotation-XOR operations are used for adequate mixing. An example of a suitable set of rotations is s1=$S^3$ and s2=$S^{67}$ (left circular shift of a 128-bit $L_i$ (or $R_{i+1} \oplus k_i$ at decryption) by 3 and by 67). In this case $G^{-1}$=G. There are a number of analogous self-inverse G functions, such as those with rotations defined by (1, 65), (2, 66), (3, 67), (4, 68), etc. It may be stated in general that for a block length of $2^n$ bits, the inverse of the function $G(x)=x \oplus rot(k, x) \oplus rot(2^{n-1}+k, x)$ is itself.

Also in instances in which the DFMN is used as a cipher, during deciphering, the first function (F) and inverse of the second function ($G^{-1}$) generally cannot be applied in parallel since the input of the first function may be needed before the first function can be applied to calculate the right half from the updated left half. Deciphering may therefore require almost twice as much time as enciphering, although their performance may still be fast since fewer rounds may be required than as by the original Feistel cipher.

In instances in which a linear function is chosen for the second function (G), a nonlinear function may be chosen for the first function (F). One example of a suitable first function includes a plurality of logical NAND operations each of which is for a respective pair of shifted versions of the input left half, and a logical XOR for the respective outputs of the NAND operations. In the context of three NAND operations, the first function may include the following:

a first NAND operation for a first pair of shifted versions of $L_i$;

a second NAND operation for a second pair of shifted versions of $L_i$;

a third NAND operation for a third pair of shifted versions of $L_i$; and an XOR operation for the respective outputs of the first, second and third NAND operations.

Similar to the second function, in hardware implementations, these shifts or rotations may not consume time as they may be simply implemented with wirings. Thus, the first function may only require the time of two XOR gate delays, plus the delays of the two input NAND gates (although AND or NOR gates work equally well), which with optimized cell libraries, may be the time equivalent of four NAND2 gate delays.

The DMFN network 500 can be implemented with keys $h_i$ and $k_i$ to double the mixing performance of the DMFN networks (compared to the original Feistel network), as illustrated in FIG. 5. As a design choice, by applying the round key $k_i$ to alter $R_{i+1}$ instead of $L_i$, the work calculating the two halves $R_{i+1}$ and $L_{i+1}$ of the round output may be balanced. That is, the two halves may become available in the same time. But $R_i$ may be unused while the first function (F) is applied. Thus, as shown in FIG. 5, $R_i$ may be mixed with another round key $h_i$ without upsetting the balance. This way both $R_{i+1}$ and $L_{i+1}$ may be influenced by key material. The DMFN shown in FIG. 5 may achieve better overall speed at the same mixing properties when functions of similar complexity are chosen for the first function (F) and second function (G). In yet other examples such as in instances in which the second function is slower to calculate than the first function, the mixing in of $k_i$ may be omitted, which may result in a scheme similar to the DMFN shown in FIG. 5 in mixing properties, but slightly faster.

FIG. 6 illustrates various operations in a method 600 of providing security in a computer system, according to example implementations of the present disclosure. As shown at block 610, the method 600 may include receiving multiple parameters including at least one of an initial key, a nonce, a sequence number, and/or a previous key. The method 600 may include applying a mix function (e.g., MIX( ) or "mixing function") to generate a subsequent key (e.g., a next key) based on the multiple parameters for key rolling, as shown at block 620. In other words, the subsequent key can be generated using the mix function in a single clock cycle of the one or more logic circuits of the method 600. The mixing function can include at least one of an XOR logic tree, a substitution-permutation network (SPN), and a double-mix Feistel network (DMFN)). The XOR logic tree, a substitution-permutation network (SPN), and a double-mix Feistel network are mixing functions themselves, and several of the mixing functions can also be used in parallel, combining the output of the mixing functions by an XOR or addition operation. Also, the XOR logic tree, a substitution-permutation network (SPN), and a double-mix Feistel network can be used in key generators as the mixing function. That is the mix function can include at least one of the XOR logic tree, the substitution-permutation network (SPN), and/ or the double-mix Feistel network (DMFN).

Also, in one aspect, the mixing function may be reapplied to generate the subsequent keys after a predetermined number of predetermined number of blocks of the data have been encrypted. Also, new, subsequent keys can be used to authenticate a message, by rolling the authentication keys. The mixing function can utilize an amount of secret random key material, which may be generated from a short single key, by a random number generator, and/or a combination of the single key and the random number generator. The mixing function can also use one of an identification (ID) of a sender, an ID of a recipient, a current date, and/or a time stamp in the mix function to generate a subsequent key based on the received parameters. Also, the mixing function can be invertible function and/or a non-linear function.

The method 600 may include encrypting data using the new, subsequent key, as shown at block 630. That is, a predetermined sized block of the data can be encrypted or decrypted using the subsequent key.

FIG. 7 illustrates various operations in a method 700 of providing security in a communication system, according to example implementations of the present disclosure. As shown at block 710, the method 600 may include generating a new key, typically in a single clock cycle, after a predetermined number of transmitted data blocks have used a previous key (e.g., a previous encryption key and/or authentication key). The method 600 may include applying a mix function (e.g., MIX( ) or "mixing function) to generate a subsequent key (e.g., a next, rolled key) based on multiple parameters for key rolling, as shown at block 720. In other words, the new key can be generated using the mix function typically in a single clock cycle of the one or more logic circuits of the method 600. The mixing function can include at least one of an XOR logic tree, a substitution-permutation network (SPN), and a double-mix Feistel network. Also, in one aspect, the mixing function may be reapplied to generate the subsequent key after a predetermined number of predetermined sized blocks of the data have been encrypted. Also, the new key can be used to authenticate a message, encryption keys, and/or authentication keys. The mixing function can utilize an amount of secret random key material generated from one short single key, a random number generator, and/or a combination of the single key and the random number generator. The mixing function can also use one of an identification (ID) of a sender, an ID of a recipient, a current date, and/or a time stamp in the mix function to generate a subsequent key based on the received parameters. Also, the mixing function can be invertible function and/or a non-linear function.

The method 700 may include encrypting data using the new, subsequent key, as shown at block 730. That is, a predetermined number of blocks of the data can be encrypted or decrypted using the subsequent key. The method 700 may include transmitting a message (using the new key for each predetermined size data block of the message) to a receiver, as shown at block 740. When transmitting the message, the message header may be encrypted, contain a nonce used for a first key, include both the ID of the recipient and the ID of the sender. The transmitted message may include plurality of message data blocks. Also, the transmitter of the message and receiver of the message cannot share changing hidden information, but can share the current encryption and authentication keys and compute the same new keys.

It should be noted that the new key may also be used to decrypt a transmitted message. By employing the mixing function for generating the new key typically within a single clock cycle for key rolling, side channel leakage is substantially reduced to a minimum while increasing the energy efficiency and speed of communication.

Moreover, the techniques described herein, not only improve the security, but speed up the information processing and reduce the energy use of communication. For example, applications include in-flight networks with sensors and computers, on board entertainment systems, passenger WiFi network in commercial airplanes, military and space programs, corporate networks and smart mobile devices.

Hence, as described herein, the systems and methods as describe herein of encrypting and authenticating messages in a communication system can include generating new keys by receiving a plurality of parameters including at least one of an initial key, a nonce, a sequence number, and a previous key. The systems and methods may include applying a mix function to generate a subsequent key based on the plurality of parameters for key rolling. The method may include encrypting and authenticating data using different subsequent keys. In one aspect, the systems and methods can encrypt a predetermined number of blocks of the data using the subsequent key for encrypting, reapply the mix function to generate the subsequent key after a predetermined number of predetermined sized blocks of the data have been encrypted; authenticate a message using the subsequent key; and decrypt the data using an alternative different subsequent key. It should be noted that data encryption keys and data authentication keys must be different. For example, the initial keys are always chosen to be different, so even the same key rolling algorithms will generate different keys, but the key rolling algorithms can also be different for encryption and data authentication.

FIG. 8 illustrates a network of computing devices 810 on which modules of this technology may execute. A computing device 810 is illustrated on which a high-level example of the technology may be executed. The computing device 810 may include one or more processors 812 that are in communication with memory devices 820. The computing device may include a local communication interface 818 for the components in the computing device. For example, the local communication interface may be a local data bus and/or any related address or control busses as may be desired.

The memory device 820 may contain modules 824 that are executable by the processor(s) 812 and data for the modules 824. The modules 824 may execute the functions described earlier. An encryption/decryption module 822 may also be located in the memory device 820 for encrypting, decrypting, and using a mixing function on data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. An example of an I/O device is a display screen that is available to display output from the computing devices. Other known I/O device may be used with the computing device as desired. Networking devices 816 and similar communication devices may be included in the computing device. The networking devices 816 may be wired or wireless networking devices that connect to the Internet, a LAN, WAN, or other computing network.

The components or modules that are shown as being stored in the memory device 820 may be executed by the processor 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid-state drive, memory card, a hard drive, optical disk, floppy disk, magnetic tape, or any other memory components.

The processor 812 may represent multiple processors and the memory 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations, which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system for encrypting data in a communication system, the system comprising one or more application-specific integrated circuits, each comprising at least one logic gate and configured to:
   utilize a plurality of mix parameters for a key rolling operation as logic gate inputs, the plurality of mix parameters including an initial key that is shared between a sender and a recipient of the data, a nonce, a sequence number of the key rolling operation, and a previous rolled key of the key rolling operation at a previous one of the sequence number of the key rolling operation;
   apply a bit-mix function utilizing a first selection of the plurality of mix parameters, including the initial key and a first one of the nonce, to generate a first one of a subsequent rolled key of the key rolling operation in at most two clock cycles of the one or more application-specific integrated circuits;
   encrypt at least one block of the data using the first one of the subsequent rolled key;
   reapply the bit-mix function utilizing a second selection of the plurality of mix parameters, including at least two of the initial key, a second one of the nonce, the sequence number of the key rolling operation, and the first one of the subsequent rolled key as the previous rolled key, to generate a second one of the subsequent rolled key of the key rolling operation, which is not correlated to the first one of the subsequent rolled key, in at most two clock cycles of the one or more application-specific integrated circuits; and
   encrypt at least one other block of the data using the second one of the subsequent rolled key,
   wherein the one or more application-specific integrated circuits is configured to reapply the bit-mix function to generate the subsequent rolled key after a predetermined number of blocks of the data have been encrypted.

2. The system of claim 1 wherein the one or more application-specific integrated circuits being configured to generate the subsequent rolled key using the bit-mix function in one clock cycle of the one or more application-specific integrated circuits.

3. The system of claim 1 wherein the bit-mix function includes at least one of an XOR logic tree, a substitution-permutation network (SPN), and a double-mix Feistel network (DMFN).

4. The system of claim 1 wherein the one or more application-specific integrated circuits being configured to reapply the bit-mix function to generate key K[i] as another one of the subsequent rolled key, which is not correlated to any other one of the subsequent rolled key, in at most two clock cycles of the one or more application-specific integrated circuits, wherein the bit-mix function is used in an equation of at least one of:

$K[i]=\text{MIX}(K[i-1])$, $K[i]=\text{MIX}(K[i-1],i)$, $K[i]=\text{MIX}(K[0],\text{nonce})$, or $K[i]=\text{MIX}(K[i-1],\text{nonce})$, where i is the sequence number, K[0] is the initial key, MIX is the bit-mix function, and K[i-1] is the previous rolled key.

5. The system of claim 1 wherein the one or more application-specific integrated circuits being configured to encrypt another predetermined number of blocks of the data using the subsequent rolled key for encrypting.

6. The system of claim 1 wherein the one or more application-specific integrated circuits being configured to authenticate a message using the subsequent rolled key.

7. The system of claim 1 wherein the one or more application-specific integrated circuits being configured to perform at least one of:
   applying the bit-mix function according to an amount of secret random key material generated from one of a single key, a random number generator, and a combination of the single key and the random number generator; and
   using one or more of an identification (ID) of a sender, an ID of a recipient, a current date, and a time stamp in the bit-mix function to generate the subsequent rolled key based on the plurality of mix parameters.

8. The system of claim 1 wherein the bit-mix function is both an invertible function and a non-linear function.

9. The system of claim 1 wherein the one or more application-specific integrated circuits being configured to perform at least one of:
   applying the bit-mix function according to an amount of secret random key material generated from one single key, a random number generator, or a combination of the single key and the random number generator, wherein the bit-mix function is an invertible function, and a non-linear function; and
   using at least one of an identification (ID) of a sender, an ID of a recipient, a current date, and a time stamp in the bit-mix function to generate the subsequent rolled key based on the plurality of mix parameters.

10. A method for encrypting data in a communication system implemented by one or more application-specific integrated circuits, the method comprising:
    utilizing a plurality of mix parameters for a key rolling operation, the plurality of mix parameters including an initial key shared between a sender and a recipient of data, a nonce, a sequence number of the key rolling operation, and a previous rolled key of the key rolling operation at a previous one of the sequence number of the key rolling operation;
    applying a bit-mix function utilizing a first selection of the plurality of mix parameters, including the initial key and a first one of the nonce, to generate a first one of a subsequent rolled key of the key rolling operation in at most two clock cycles of the one or more application-specific integrated circuits;
    encrypting at least one block of the data using the first one of the subsequent rolled key;
    reapplying the bit-mix function utilizing a second selection of the plurality of mix parameters, including at least two of the initial key, a second one of the nonce, the sequence number of the key rolling operation, and the first one of the subsequent rolled key as the previous rolled key, to generate a second one of the subsequent rolled key of the key rolling operation, which is not correlated to the first one of the subsequent rolled key, in at most two clock cycles of the one or more application-specific integrated circuits; and
    encrypting at least one other block of the data using the second one of the subsequent rolled key,
    wherein the bit-mix function is reapplied to generate the subsequent rolled key after a predetermined number of blocks of the data have been encrypted.

11. The method of claim 10 further comprising generating the subsequent rolled key using the bit-mix function in one clock cycle of the one or more application-specific integrated circuits.

12. The method of claim 10 further comprising using at least one of an XOR logic tree, a substitution-permutation network (SPN), and a double-mix Feistel network in the bit-mix function.

13. The method of claim 12 further comprising reapplying the bit-mix function to generate key K[i] as another one of the subsequent rolled key, which is not correlated to the any other one of the subsequent rolled key, in at most two clock cycles of the one or more application-specific integrated circuits, wherein the bit-mix function is used in at least one of the following equations:

$$K[i]=MIX(K[i-1]),$$

$$K[i]=MIX(K[i-1],i),$$

$$K[i]=MIX(K[0],nonce), \text{ or}$$

$$K[i]=MIX(K[i-1],nonce),$$

where i is the sequence number, K[0] is the initial key, MIX is the bit-mix function, and K[i−1] is the previous rolled key.

14. The method of claim 10 further comprising encrypting a another predetermined number of blocks of the data using the subsequent rolled key for encrypting.

15. The method of claim 10 further comprising authenticating a message using the subsequent rolled key.

16. A method for providing security in a communication system implemented by one or more application-specific integrated circuits, the method comprising:
utilizing a plurality of mix parameters for a key rolling operation, the plurality of mix parameters including an initial key shared between a sender and a recipient of data, a nonce, a sequence number of the key rolling operation, and a previous rolled key of the key rolling operation at a previous one of the sequence number of the key rolling operation;
applying a bit-mix function utilizing a first selection of the plurality of mix parameters, including the initial key and a first one of the nonce, to generate a first one of a subsequent rolled key of the key rolling operation in at most two clock cycles of the one or more application-specific integrated circuits;
encrypting at least one block of the data using the first one of the subsequent rolled key;
reapplying the bit-mix function utilizing a second selection of the plurality of mix parameters, including at least two of the initial key, a second one of the nonce, the sequence number of the key rolling operation, and the first one of the subsequent rolled key as the previous rolled key, to generate a second one of the subsequent rolled key of the key rolling operation, which is not correlated to the first one of the subsequent rolled key, in at most two clock cycles of the one or more application-specific integrated circuits; and
encrypting at least one other block of the data using the second one of the subsequent rolled key,
wherein at least one of an XOR logic tree, a substitution-permutation network (SPN), and a double-mix Feistel network is included in the bit-mix function, and
wherein the bit-mix function is reapplied to generate the subsequent rolled key after a predetermined number of blocks of the data have been encrypted.

17. The method of claim 16 further comprising reapplying the bit-mix function to generate key K[i] as another one of the subsequent rolled key, which is not correlated to any other one of the subsequent rolled key, in at most two clock cycles of the one or more application-specific integrated circuits, wherein the bit-mix function is used in at least one of the following equations:

$$K[i]=MIX(K[i-1]),$$

$$K[i]=MIX(K[i-1],i),$$

$$K[i]=MIX(K[0],nonce), \text{ or}$$

$$K[i]=MIX(K[i-1],nonce),$$

where i is the sequence number, K[0] is the initial key, MIX is the bit-mix function, and K[i−1] is the previous rolled key.

18. The method of claim 16 further comprising performing at least one of:
encrypting the predetermined number of blocks of the data using the first one of the subsequent rolled key for encrypting;
reapplying the bit-mix function to generate the second one of the subsequent rolled key after the predetermined number of predetermined sized blocks of the data have been encrypted;
and
decrypting the data using a third one of the subsequent rolled key generated by the bit-mix function.

19. The method of claim 16 further comprising generating the subsequent rolled key using the bit-mix function in one clock cycle of the one or more application-specific integrated circuits.

20. The method of claim 16 further comprising authenticating a message using one of the first one of the subsequent rolled key or the second one of the subsequent rolled key.

* * * * *